Patented July 22, 1924.

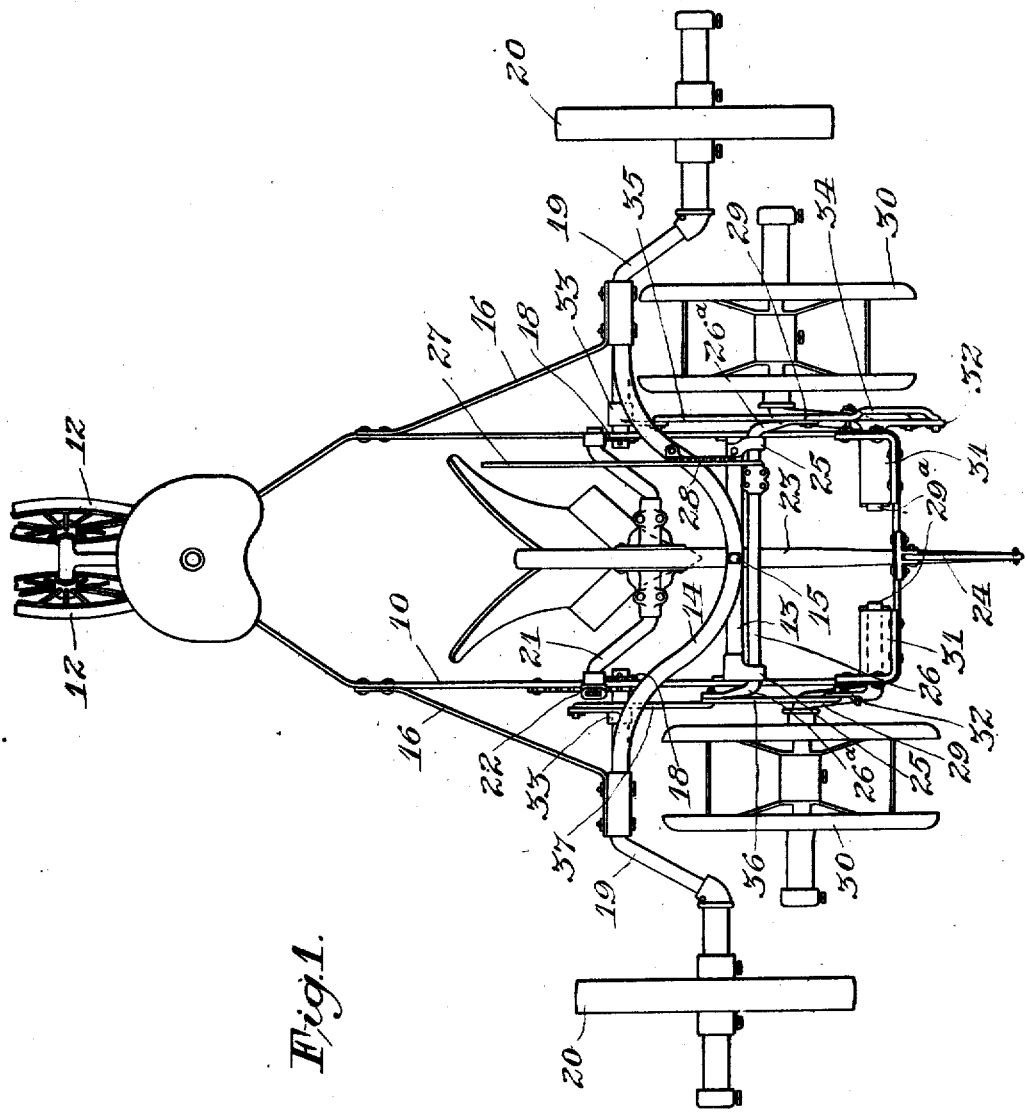

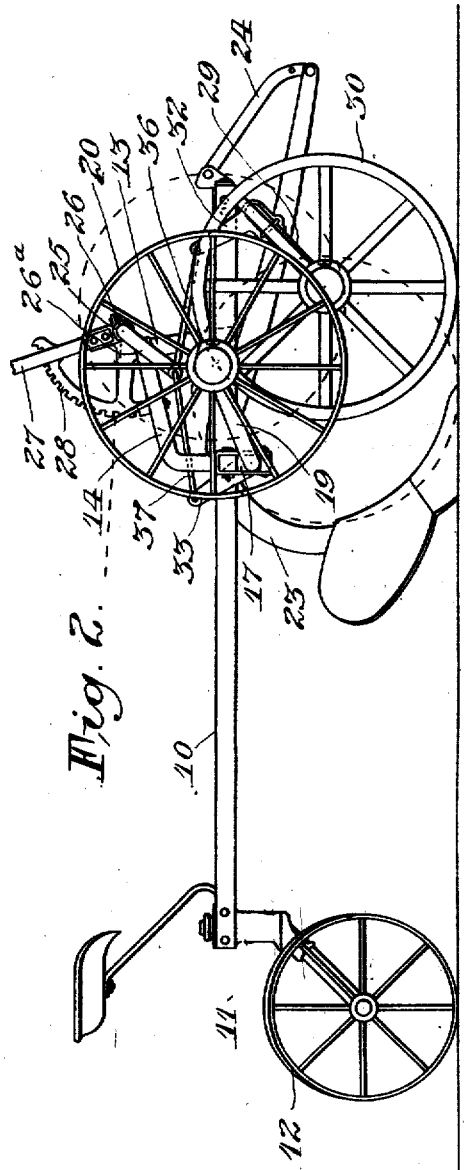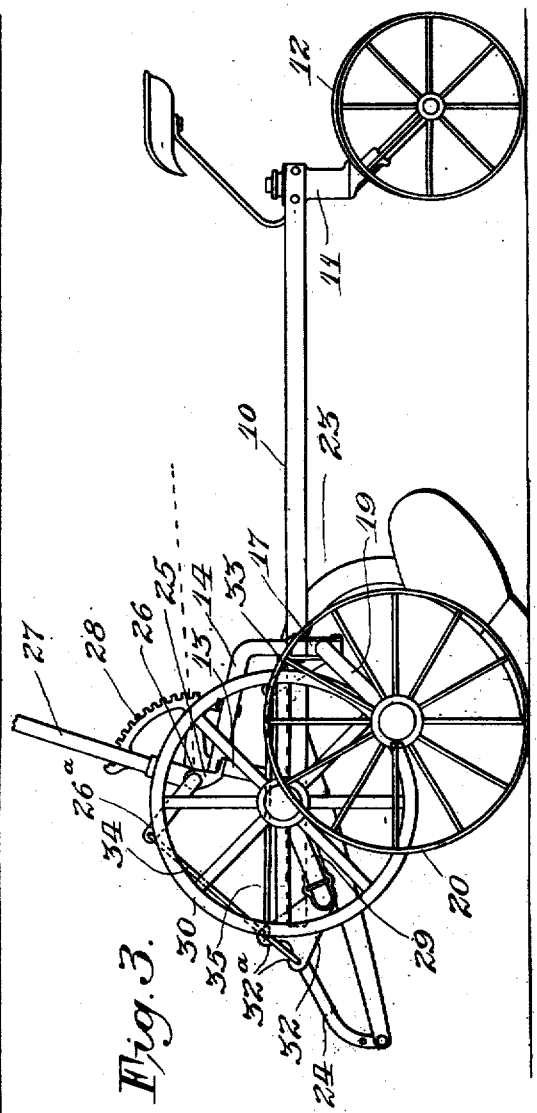

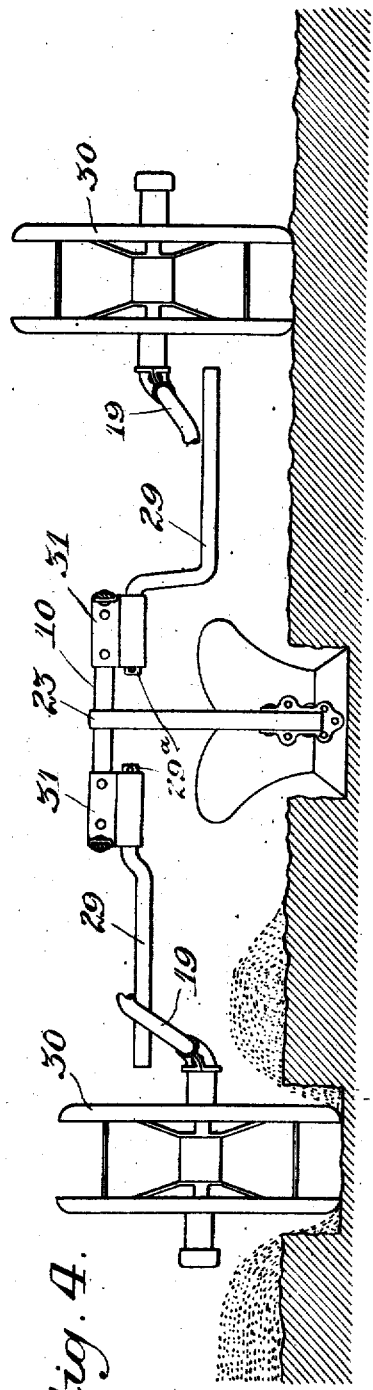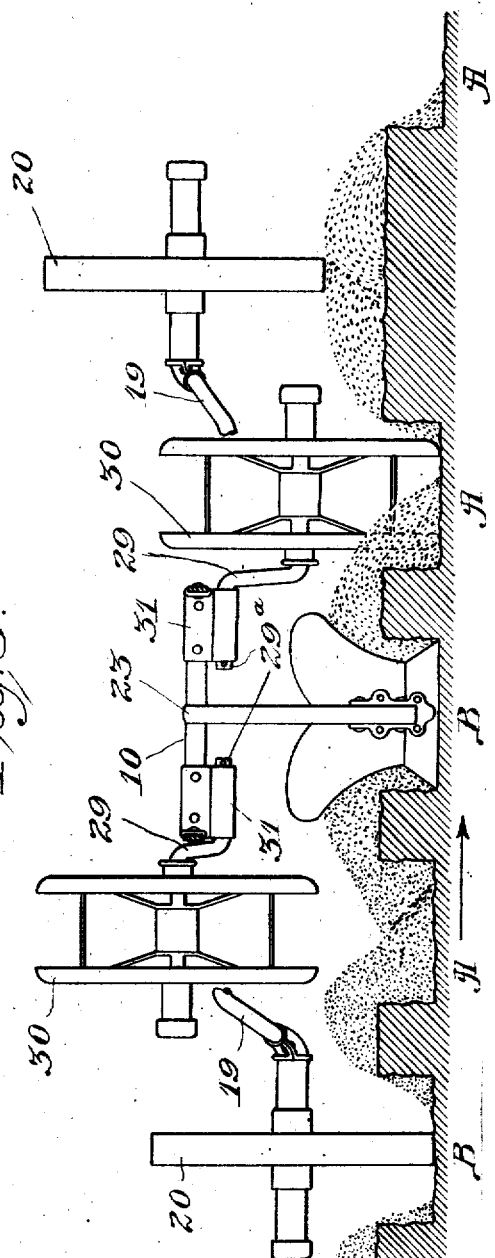

1,501,955

UNITED STATES PATENT OFFICE.

ALEXUS C. LINDGREN, OF EVANSTON, ILLINOIS, ASSIGNOR TO INTERNATIONAL HARVESTER COMPANY, A CORPORATION OF NEW JERSEY.

LISTER PLOW.

Application filed November 12, 1921. Serial No. 514,508.

*To all whom it may concern:*

Be it known that I, ALEXUS C. LINDGREN, a citizen of the United States, residing at Evanston, in the county of Cook and State of Illinois, have invented certain new and useful Improvements in Lister Plows, of which the following is a full, clear, and exact specification.

My invention relates to furrow forming machines, and more particularly to those of the type used in lister plowing. When parallel furrows are to be made it is usually the practice to guide the furrow forming implement by means of a previously formed furrow, as by causing one of the supporting wheels to run in a previously formed furrow while the implement traverses the field, and in its broadest aspect my invention contemplates provision of a machine of the type stated in which the location of the wheels supporting the implement may be changed in a manner to bring the tool from a normal location midway between two supporting wheels to alternative locations nearer one supporting wheel than another, with the result that a furrow parallel to a previously formed furrow can be made at variable distances from the previous furrow which is engaged by a supporting wheel acting as a guide.

More specifically, my invention is intended for use in connection with lister plows of the wide tread type with the object of making the plow available for relisting, or double listing, as well as single listing. When single listing the machine is working on a clear or flat field, and after the first furrow is formed one wheel travels in the previous furrow to gage the one being plowed until the listed field presents a succession of parallel alternating furrows and ridges. In double listing it becomes necessary to burst out the ridges existing between the successive furrows made during the operation of single listing, and forming new furrows in place of such ridges, but due to the fact that the ordinary wide tread lister straddles two rows it is not a practical machine for double listing as it must run with one wheel on a ridge and the other in the last furrow formed in order to bring the plow over an intermediate ridge, making it very difficult to keep the plow in the ridge for in this case the last furrow formed is intermediate the original furrows made while single listing, and this last furrow is not likely to be exactly parallel with the original furrows and ridges, and its irregularities will tend to be multiplied as the plow works the successive ridges. The specific object of my invention is to obviate this difficulty by making it possible to eliminate the wheel that rests on a ridge when the wide tread lister is used for double listing, and substitute for it a furrow following wheel nearer the plow and positioned to run in the old furrow next adjacent the ridge being plowed and necessarily parallel with it, thus leveling the machine, accurately guiding the plow, and forcing it to remain in the ridge.

I accomplish the objects of my invention by adding to a wide tread lister of essentially the construction shown in the patent to Graham No. 1,265,322, May 7, 1918, a pair of auxiliary wheels positioned on either side of the plow and located midway between the plow and the main wheel on each side, and by connecting the wheel shifting mechanism of the lister with the auxiliary wheels in such a way that one main wheel of the lister and the opposite wheel of the auxiliary pair will be shifted in one direction in unison, while the other wheel of each pair is moving in the opposite direction, thus making one main wheel and one auxiliary wheel the supporting wheels of the lister alternately and changing the relative location of the plow with respect to the wheels from one side to the other without moving the plow, thus converting the wide tread machine with a two row spread, into one having a spread of one and a half rows and at the same time keeping the plow in required position for work back and forth across a field.

With these objects in view my invention comprises the organization and details of construction set forth in the following specification and hereinafter claimed.

Referring to the accompanying drawings on which like characters designate corresponding parts:

Figure 1 is a plan view of a wide tread lister embodying my invention;

Fig. 2 is a side elevation looking from the left hand side of Fig. 1;

Fig. 3 is a similar view looking from the right hand side of Fig. 1;

Fig. 4 is a rear elevation with parts omitted showing the machine being used for single listing; and, Fig. 5 is a similar view showing the machine being used for double listing.

I have illustrated my invention in connection with a wide tread lister essentially the same in construction as that shown in the patent to Graham before referred to, the machine comprising a frame member 10 having side bars which converge toward their rear ends where they are joined together by a bracket 11 in which is journaled the vertical spindle of the usual pair of rear furrow wheels 12. An arch member 13 has its lower ends connected to the side bars of the frame member 10, and a second arch member 14, preferably a hollow pipe, is secured in position upon the arch 13 as by bolt 15, and has its outer ends at each side of the machine connected by means of diagonally disposed brace bars 16 with the adjacent side bar of the frame 10. Beneath each end of the arch 14, which extends backwardly and downwardly, as shown in Fig. 3, there is secured a bearing bracket 17, and a second bearing bracket 18 is mounted in alignment therewith beneath each side member of the frame 10. In these bearing brackets there is journaled the horizontal portions of the crank axles 19 on which are journaled the main supporting wheels 20 of the lister. The frame 10 has journaled within it a bail 21 which may be adjusted through the medium of the lever and rack 22, and which serves to support the beam 23 of the plow. The front end of the beam is connected by a draft link 24 to the front end of the frame in a manner to permit vertical adjustment of the plow. The arch member 13 has bearing brackets 25 secured thereto at either side, and in these brackets there is journaled a rock shaft 26 which is formed with oppositely directed arms 26ª extending at right angles therefrom at each end. Secured to rock shaft 26 at one side thereof is a lever 27 which co-operates with the rack 28 fixed to arch member 13 for locking rock shaft 26 in adjusted position. The construction so far described differs but little from that of the patent above mentioned, the equivalent of the rock shaft 26 in above patent having its arms connected to crank axles of the lister in such manner as to turn them in reverse directions to lower one wheel and raise the other simultaneously. This is retained in the construction embodying my invention, and in addition thereto I mount on each side of the forward portion of the frame 10 an auxiliary cranked spindle 29 which carries an auxiliary wheel 30. Each auxiliary axle has a horizontal portion 29ª journaled in brackets 31 secured to the corners of the frame 10, and has secured thereto at its upper angle an upstanding arm 32, and each of the main axles 19 has a similar arm secured thereto at 33. The arm 32 on the auxiliary crank at the left side of the frame is formed to afford two points of connection as by forking the arm in the manner shown at 32ª (Fig. 3), and the forward one of these connecting points has pivoted thereto one end of a link 34 which has its other end connected to the arm 26ª on the adjacent end of rock shaft 26. The other connecting point on this arm 32 receives one end of a link 35, which extends rearwardly and is connected to the arm 33 of the axle 19 on the same side of the frame. On the opposite side of the frame (Fig. 2) the arm 32 is connected by a link 36 to the arm 26ª on that end of rock shaft 26, and the arm 33 on the axle 19 of that side is similarly connected to arm 26ª by a link 37. Due to the arrangement of links connecting the main and auxiliary crank axles, it will be evident that rocking shaft 26 by means of lever 27 will result in imparting movement in reverse directions to the wheels on each side of the frame. On the left side of the frame, as viewed in Fig. 3, a backward pull on lever 27 would swing the auxiliary crank 29 downwardly and through link 35 would swing the main axle 19 upwardly. On the right side of the frame, similar movement of lever 27 would swing the auxiliary crank 29 upwardly through link 36 and the main crank 19 downwardly through link 37. In this way it will be seen that the adjacent wheels of both pairs and the opposite wheels of each pair are simultaneously shifted in opposite directions and that the respective wheels balance each other, making the shifting operation easy.

With my invention applied to a wide tread lister in the manner above described, the relative positions of the spindles and wheels, when the machine is being used for single listing, will be as shown in Fig. 4, the double tread wheels being on the main spindles and the auxiliary spindles being wheelless, in which condition they will not interfere with operation of the machine for single listing. When double listing, the double tread wheels are placed on the auxiliary spindles because one of the wheels on the auxiliary spindles then becomes the guiding or furrow following wheels which runs in one of the original furrows (A, Fig. 5), as the machine travels back and forth across the field working in the direction of the arrow (Fig. 5). The new, or intermediate, furrows (B) do not serve as guides, and it is immaterial whether the main wheels are single or double tread. Preferably, therefore, single tread wheels are used, and one of these runs in a B furrow and the other is above a ridge on the opposite side, while on the return trip of the machine, as viewed in Fig. 5, the opposite auxiliary wheel will be in the furrow A at the extreme right of the figure, the plow will be in the adjacent ridge, and one main wheel will be in the furrow which is shown as being formed in that figure. In this way the intermediate furrows are always parallel to the old ones, by which they are gauged, and the machine is supported on wheels which run in the furrows and one of which is double treaded to engage the sides of the furrow and prevent swerving of the machines.

It will be seen from the above disclosure that I have devised an efficient and economical machine with which either single or double listing can be done, and that my invention is capable of application to furrow forming machines of other types, as covered by the scope of the following claims.

I claim as my invention:

1. In a furrow forming machine, the combination of a furrow forming tool, a frame on which the tool is mounted, supporting means on the frame adapted to engage the ground at either of two definite distances on each side of the tool with the point of support on one side of the tool substantially twice as distant from the tool as the point of support on the other side, and means for shifting from one supporting position to the other thereby reversing the respective locations of the points of support with reference to the tool.

2. The combination with a wide tread lister having a frame, a wheel at each side of the frame, a plow supported midway between said wheels, and mechanism for reversely shifting the wheels vertically, of a cranked spindle journaled in horizontal bearings on each side of the frame between the plow and the wheels, auxiliary frame supporting means on said spindles and means for turning the spindles in their bearings to raise and lower the spindles comprising an operating connection between each spindle and the shifting mechanism for the adjacent wheel, including means for reversing the movement of the spindle with respect to the wheels.

3. The combination with a wide tread lister having a frame, a wheel at each side of the frame, a plow supported midway between said wheels, and mechanism for reversely shifting the wheels vertically, of an auxiliary pair of vertically shiftable wheels supported on the frame between the main wheels and on opposite sides of the plow, and means connecting the auxiliary wheels to the shifting mechanism in a manner to cause each one to be shifted oppositely to the main wheel on the same side when the wheel shifting mechanism is actuated.

4. The combination with a wide tread lister having a frame, a supporting wheel at each side of the frame, a plow supported between said wheels, and means for simultaneously shifting the wheels vertically in reverse directions, of an auxiliary wheel mounted on the frame substantially midway between the plow and one of the supporting wheels, and means cooperating with said shifting means for shifting said auxiliary wheel in reverse direction to the adjacent supporting wheel.

5. The combination with a wide tread lister having a frame, a vertically shiftable supporting wheel at each side of the frame, and a plow supported between said wheels, of an auxiliary vertically shiftable wheel mounted on the frame substantially midway between the plow and one of said supporting wheels, and means for shifting said auxiliary wheel in reverse direction to the adjacent supporting wheel.

6. The combination with a wide tread lister having a frame, a vertically shiftable supporting wheel at each side of the frame, and a plow supported between said wheels, of a furrow following wheel mounted on the frame substantially midway between the plow and one of said supporting wheels, and means for raising said supporting wheel and causing that side of the frame to be carried on said furrow following wheel.

7. The combination with a wide tread lister comprising a frame, a supporting wheel on each side of the frame and a plow supported midway between said wheels, of a furrow following element mounted on the frame substantially midway between said plow and one of the supporting wheels, and means for causing the support of the frame to be shifted from the said supporting wheel to the furrow following element.

8. A lister plow comprising a frame, a plow carried thereby, an outer and an inner pair of vertically shiftable wheels mounted on the frame, and means for shifting the adjacent wheels of both pairs and the opposite wheels of each pair simultaneously in opposite directions.

9. A lister plow comprising a frame, a plow carried thereby, an outer and an inner pair of vertically shiftable wheels mounted on the frame, and means for shifting one wheel of the outer pair and the opposite wheel of the inner pair simultaneously.

10. A furrow forming implement comprising a frame, an inner and an outer pair of carrying wheels mounted on the frame in overlapping relation, a furrow forming tool on the frame, and means for shifting the support of said frame laterally from one of the wheels of each pair to the other wheels of each pair.

11. An implement comprising a plow, ground engaging means on each side of the plow for supporting it, and means for shifting said supporting means into either of two supporting positions relative to the plow in one of which the point of support on one side is nearer the plow than on the other, and in the other of which positions the locations of said points of support relative to the plow are reversed.

In testimony whereof I affix my signature.

ALEXUS C. LINDGREN.